(12) United States Patent
Stifter et al.

(10) Patent No.: US 12,260,484 B2
(45) Date of Patent: Mar. 25, 2025

(54) REAL-TIME NON-PHOTO-REALISTIC RENDERING

(71) Applicant: Disney Enterprises, Inc., Burbank, CA (US)

(72) Inventors: Megan Stifter, Los Angeles, CA (US); Andrew E. Wood, Pasadena, CA (US); Evan A. Binder, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 88 days.

(21) Appl. No.: 17/971,383

(22) Filed: Oct. 21, 2022

(65) Prior Publication Data
US 2023/0162425 A1 May 25, 2023

Related U.S. Application Data

(60) Provisional application No. 63/281,537, filed on Nov. 19, 2021.

(51) Int. Cl.
*G06T 15/02* (2011.01)
*A63F 13/60* (2014.01)
*G06T 5/50* (2006.01)
*G06T 5/70* (2024.01)

(52) U.S. Cl.
CPC .............. *G06T 15/02* (2013.01); *A63F 13/60* (2014.09); *G06T 5/50* (2013.01); *G06T 5/70* (2024.01); *G06T 2207/20221* (2013.01)

(58) Field of Classification Search
CPC .. G06T 15/02; G06T 5/70; G06T 5/50; G06T 5/60; G06T 2207/20221; A63F 13/52; A63F 13/60
See application file for complete search history.

(56) References Cited

U.S. PATENT DOCUMENTS

2017/0249775 A1\* 8/2017 Baillard .................. G06T 15/02

FOREIGN PATENT DOCUMENTS

WO WO 2021/146741 A1 7/2021

OTHER PUBLICATIONS

Kaplan, Matthew, Bruce Gooch, and Elaine Cohen. "Interactive artistic rendering." Proceedings of the 1st international symposium on Non-photorealistic animation and rendering. 2000. (Year: 2000).\*

(Continued)

*Primary Examiner* — King Y Poon
*Assistant Examiner* — Vincent Peren
(74) *Attorney, Agent, or Firm* — Farjami & Farjami LLP

(57) ABSTRACT

According to one exemplary implementation, a system includes processing hardware and a system memory storing a non-photo-realistic (NPR) renderer. The processing hardware is configured to execute the NPR renderer to receive a digital asset, display a preliminary image corresponding to the digital asset, and receive editing data identifying an NPR effect. The processing hardware is further configured to execute the software code to produce the NPR image, in a consolidated rendering and compositing process and in real-time with respect to receiving the editing data, using the preliminary image and the editing data.

16 Claims, 4 Drawing Sheets

(56) References Cited

OTHER PUBLICATIONS

Mohr, Alex, and Michael Gleicher. "Non-invasive, interactive, stylized rendering." In Proceedings of the 2001 symposium on Interactive 3D graphics, pp. 175-178. 2001. (Year: 2001).*
Freudenberg, Bert, Maic Masuch, and Thomas Strothotte. "Walkthrough illustrations: Frame-coherent pen-and-ink style in a game engine." Computer Graphics Forum. Vol. 20. No. 3. Oxford, UK and Boston, USA: Blackwell Publishers Ltd, 2001. (Year: 2001).*
Majumder, Aditi, and Meenakshisundaram Gopi. "Hardware accelerated real time charcoal rendering." Proceedings of the 2nd international symposium on Non-photorealistic animation and rendering. 2002. (Year: 2002).*
Todo, Hideki, Ken-ichi Anjyo, William Baxter, and Takeo Igarashi. "Locally controllable stylized shading." ACM Transactions on Graphics (TOG) 26, No. 3 (2007): 17-es. (Year: 2007).*
Magdics, Milán, Catherine Sauvaget, Rubén J. García, and Mateu Sbert. "Post-processing NPR effects for video games." In Proceedings of the 12th ACM SIGGRAPH international conference on virtual-reality continuum and its applications in industry, pp. 147-156. 2013. (Year: 2013).*
Curtis CJ, Anderson SE, Seims JE, Fleischer KW, Salesin DH. "Computer-generated watercolor." Proceedings of the 24th annual conference on Computer graphics and interactive techniques, pp. 421-430, 1997. (Year: 1997).*
Mohr, Alex, and Michael Gleicher. "Non-invasive, interactive, stylized rendering." Proceedings of the 2001 symposium on Interactive 3D graphics, pp. 175-178. 2001. (Year: 2001).*
Baxter, William, Jeremy Wendt, and Ming C. Lin. "IMPaSTo: A realistic, interactive model for paint." Proceedings of the 3rd International Symposium on Non-photorealistic Animation and Rendering, pp. 45-148. 2004. (Year: 2004).*
Oh, Crystal S., and Yang-Hee Nam. "GPU-based 3D oriental color-ink rendering." Proceedings of the 2005 international conference on Augmented tele-existence, pp. 142-147. 2005. (Year: 2005).*
Wang, Chung-Ming, and Ren-Jie Wang. "Image-based color ink diffusion rendering." IEEE Transactions on Visualization and Computer Graphics 13, No. 2, pp. 235-246, 2007. (Year: 2007).*
Liang, Lingyu, and Lianwen Jin. "Image-based rendering for ink painting." In 2013 IEEE International Conference on Systems, Man, and Cybernetics, pp. 3950-3954. IEEE, 2013. (Year: 2013).*
Magdics, Milán, Catherine Sauvaget, Ruben J. García, and Mateu Sbert. "Post-processing NPR effects for video games." Proceedings of the 12th ACM SIGGRAPH international conference on virtual-reality continuum and its applications in industry, pp. 147-156. 2013. (Year: 2013).*

Santiago E. Montesdeoca, Hock-Soon Seah, Hans-Martin Rall "Art-directed Watercolor Rendered Animation" 2016 Eurogenics Association 9 pgs.
Rafael C. Gonzalez and Richard E. Woods "Digital Image Processing" Second Edition Jan. 15, 2002 797 Pgs. https://www.academia.edu/4147898/Digital_image_processing_by_Rafael_C_Gonzalez_Richard_E_Woods_2nd_Edition.
"What is Kubelka-Munk?" Harrick Scientific Products: Solutions in Optical Spectroscopy 2023 1 pg.
Ji Cheng "Art Directed Watercolor Shader for Non-Photorealistic Rendering with a Focus on Reflections" A Thesis Submitted to the Office of Graduate and Professional Studies of Texas A&M University Aug. 2017 43 Pgs.
Patrick O'Brien "A Framework for Digital Watercolor" A Thesis Submitted to the Office of Graduate and Professional Studies of Texas A&M University Aug. 2008 64 Pgs.
Cassidy J. Curtis, Sean E. Anderson, Joshua E. Seims, Kurt W. Fleischer, David H. Salesin "Computer-Generated Watercolor" Proceedings of the $24^{th}$ Annual Conference on Computer Graphics and Interactive Techniques Aug. 1997 10 Pgs.
Eugene Lei and Chun-Fa Chang " Real-Time Rendering of Watercolor Effects for Virtual Environments" Advances in Multimedia Information Processing 2004 8 Pgs.
William Baxter, Yuanxin Liu and Ming C. Lin "A Viscous Paint Model for Interactive Applications" SIGGRAPH '04: ACM SIGGRAPH 2004 Sketches Aug. 2004 8 Pgs.
Adrien Bousseau, Matt Kaplan, Joelle Thollot and Francios X. Sillion "Interactive Watercolor Rendering with Temporal Coherence and Abstraction" NPAR '06: Proceedings of the $4^{th}$ International Symposium on Non-photorealistic Animation and Rendering Jun. 2006 9 Pgs.
International Search Report and Written Opinion dated Feb. 13, 2023 for International Application PCT/US2022/049143.
Alex Mobr and Michael Gleicher "Non-Invasive, Interactive, Stylized Rendering" Proceedings of the 2001 Symposium on Interactive 3D Graphics, Mar. 2001 4 pgs.
Jiajian Chen, Greg Turk and Blair MacIntyre "Watercolor Inspired Non-Photorealistic Rendering for Augmented Reality" Proceedings of the ACM Symposium on Virtual Reality Software and Technology, VRST 2008, Bordeaux, France, Oct. 2008 4 Pgs.
Milan Magdics, Catherine Sauvaget, Ruben J. Garcia, Mateu Sbert "Post-Processing NPR Effects for Video Games" Proceedings of the $12^{th}$ ACM SIGGRAPH International Conference on Virtual-Reality Continuum and Its Applications in Industry, Nov. 2013 10 Pgs.
M.P. Pavan Kumar, B. Poornima, H.S. Nagendraswamy, C. Manjunath "Structure-Preserving NPR Framework for Image Abstraction and Stylization" The Journal of Supercomputing, Aug. 2021 69 Pgs.

* cited by examiner

REAL-TIME NON-PHOTO-REALISTIC RENDERING

RELATED APPLICATIONS

The present application claims the benefit of and priority to a pending Provisional Patent Application Ser. No. 63/281,537 filed on Nov. 19, 2021, and titled "Real-Time Non-Photo-Realistic Rendering," which is hereby incorporated fully by reference into the present application.

BACKGROUND

Game engines have traditionally been built on a graphics foundation that focuses on achieving the highest quality of photo-realistic rendering possible at a high frame-rate to allow for user interaction. By contrast, non-photo-realistic (NPR) rendering refers to different approaches to render engineering that result in images that don't mimic real-life, but instead focus on creating a certain look that mimics different formats and mediums, or that can be art directed to achieve aesthetic looks and styles that have never before been seen. However, existing solutions for performing NPR rendering using offline renderers typically require undesirably long render times, such as several hours per frame, as well as several render passes compiled in compositing software. Consequently, there is a need in the art for an NPR rendering solution enabling the real-time production of NPR images at high frame-rates in a cohesive package.

DETAILED DESCRIPTION

Figure 1:
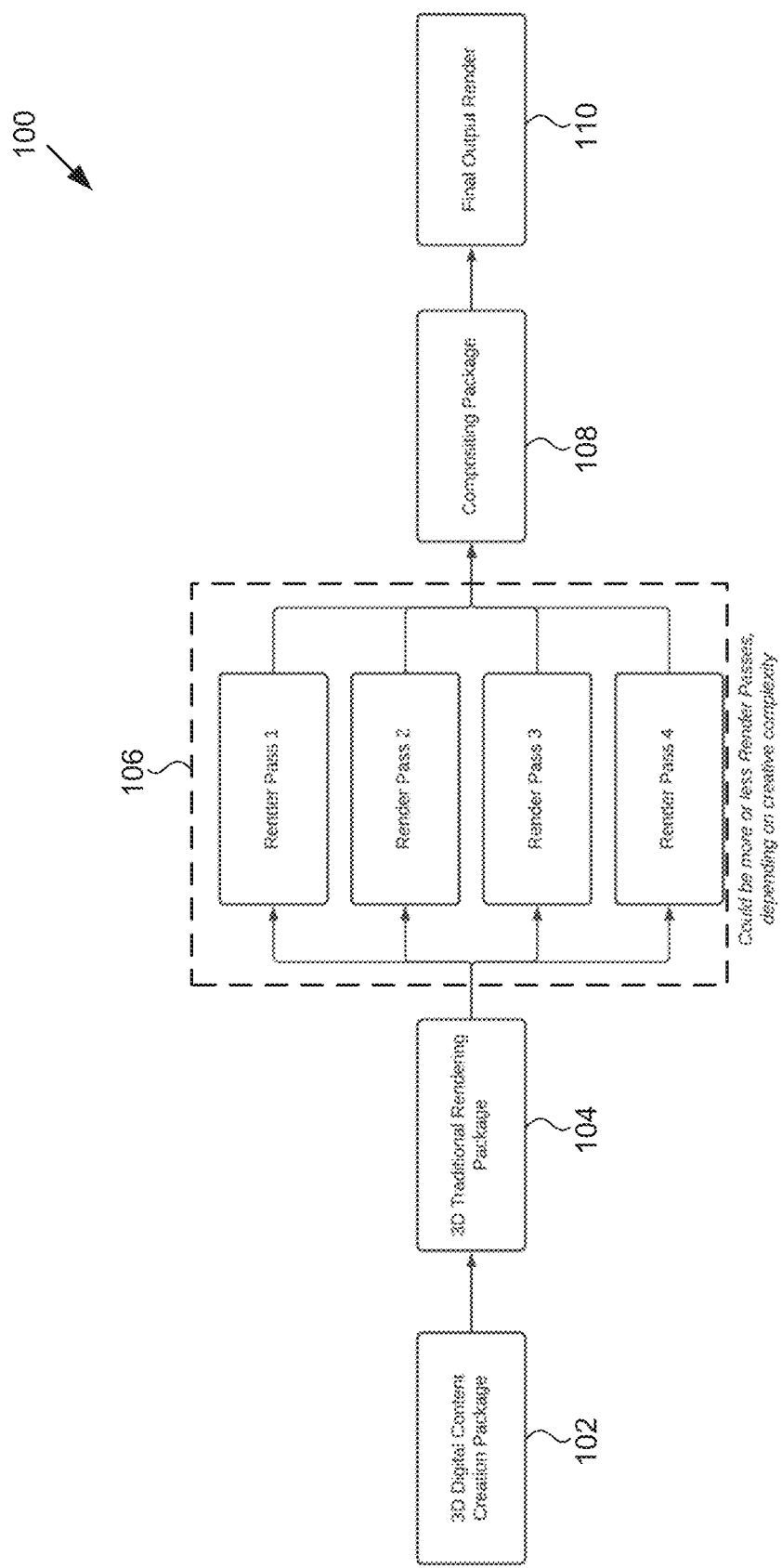
FIG. 1 shows a traditional pipeline for generating three-dimensional (3D) renders.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As stated above, game engines have traditionally been built on a graphics foundation that focuses on achieving the highest quality of photo-realistic rendering possible at a high frame-rate to allow for user interaction. As further stated above, by contrast, non-photo-realistic (NPR) rendering refers to different approaches to render engineering that result in images that don't mimic real-life, but instead focus on creating a certain look that mimics different formats and mediums, or that can be art directed to achieve aesthetic looks and styles that have never before been seen. An example of this would be creating a graphics pipeline that creates a watercolor or comic-book look atop of three-dimensional (3D) models and lighting. While graphics packages exist in the market to create these kinds of looks in a traditional rendering process, a package that covers all elements to achieve these looks does not exist for real-time rendering at high frame-rates in a cohesive package.

The present application is directed to reducing computation times for NPR rendering. The present application discloses a customized or partially customized game engine configured to perform real-time NPR rendering, as well as an NPR software plugin and tooling software that can serve as a plugin to a conventional game engine and that modifies the stock renderer included in the game engine with a custom NPR renderer that enables compositing of artistic images in real-time, thereby requiring low overhead for final rendering. The concepts disclosed herein advance the state-of-the-art significantly beyond existing solutions created for offline renderers that require long render times, such as several hours per frame, as well as several render passes compiled in compositing software. Moreover, in some implementations, the systems and methods disclosed by the present application may be substantially or fully automated.

As defined for the purposes of the present application, the terms "automation," "automated," and "automating" refer to systems and processes that do not require the participation of a human system administrator. Although in some implementations, a human editor or artist may review the images composited by the automated systems and methods described herein in real-time, such as within less than sixty seconds (60 s), or even within ten seconds (10 s) or less, for example, of entering editorial or artistic inputs, that human involvement is optional. Thus, in some implementations, the methods described in the present application may be performed under the control of hardware processing components of the disclosed automated systems.

FIG. 1 shows a traditional pipeline for generating 3D renders. As shown in FIG. 1, traditional pipeline 100 includes 3D digital content creation package 102, 3D traditional rendering package 104, multiple render passes 106, compositing package 108, and final output render 110. It is noted that although the exemplary implementation shown in FIG. 1 depicts four render passes, in a traditional pipeline such as traditional pipeline 100, more or less than four render passes may be included among multiple render passes 106, depending on the creative complexity of the content being produced.

It is further noted that, as shown in FIG. 1, multiple rendering passes 106 and compositing package 108 represent post-processing of the output of 3D traditional render package 104. Due to the significant processing resources required to generate multiple rendering passes 106, composite those renders using compositing package 108, and refine the performance of 3D traditional rendering package 104, the generation of final output render 110 may require multiple hours per image or video frame.

Figure 2:
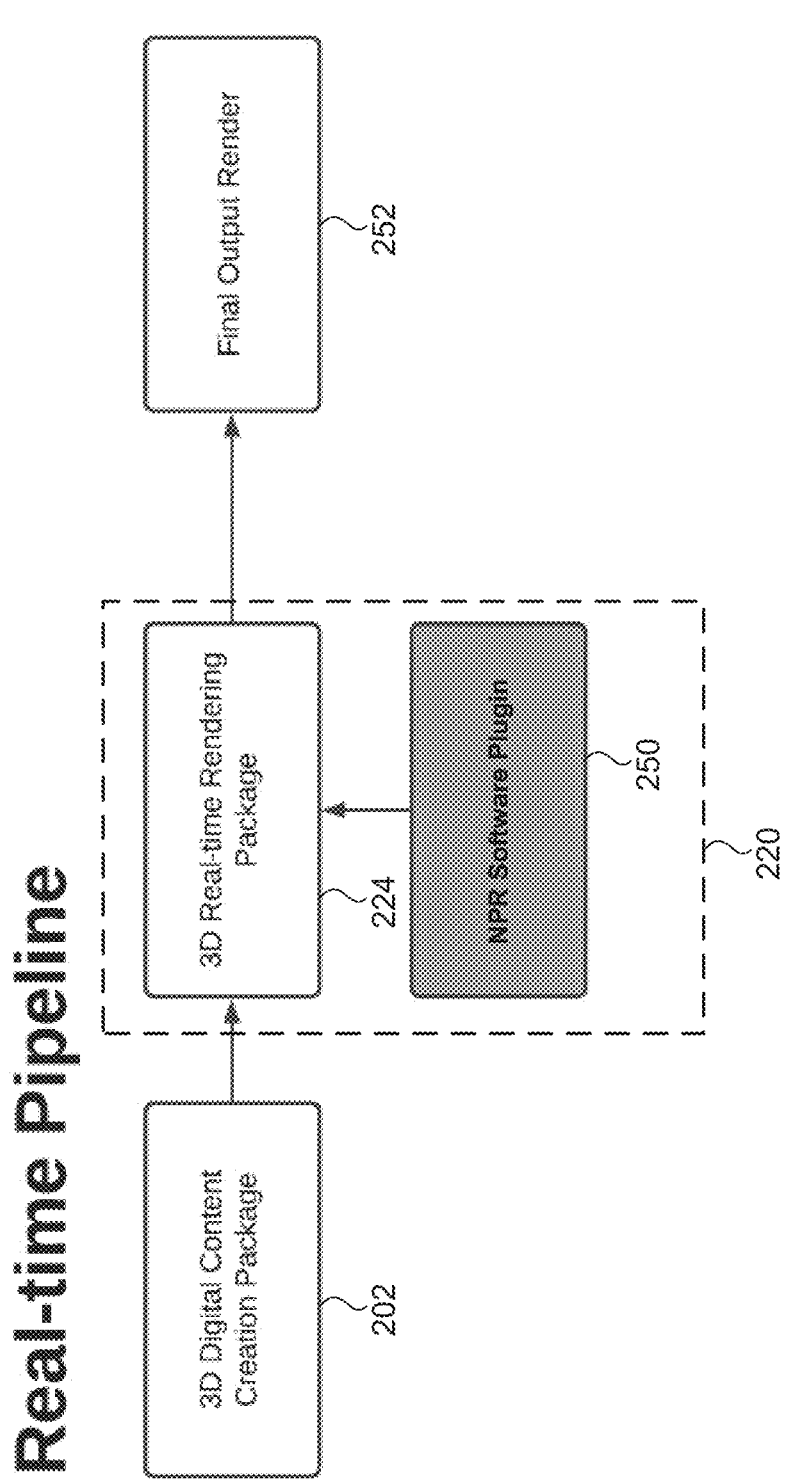
FIG. 2 shows an exemplary real-time pipeline for producing non-photo-realistic (NPR) images, according to one implementation.

Referring to FIG. 2. FIG. 2 shows real-time pipeline 200, according to one implementation of the present novel and inventive concepts. As shown in FIG. 2, real-time pipeline 200 includes 3D digital content creation package 202, enhanced 3D rendering package 220 (hereinafter "NPR renderer 220") including 3D real-time rendering package 224 provided using NPR software plugin 250, and final output render 252.

It is noted that, in contrast to traditional pipeline 100, real-time pipeline 200 advantageously consolidates rendering passes 106 and compositing package 108 as codified instructions executed by 3D real-time rendering package 224 under the control of NPR software plugin 250. That is to say, rendering passes 106 and the actions performed by compositing package 108 in a post-processing sequence in traditional pipeline 100 are advantageously performed in real-time pipeline 200, not during post-processing, but during rendering by 3D real-time rendering package 224 and NPR software plugin 250. Consequently, real-time pipeline 200 enables content artists and other content creators to generate unique styles and "unreal" looks within a fraction of a time that a traditional process would require, and with substantially fewer steps.

It is further noted that a stock game engine, such as a game engine included in 3D traditional rendering package 104, in FIG. 1, is configured to create realistic images based on the physics of light transport phenomena. By contrast, in some implementations NPR software plugin 250 may alter the performance of a stock game engine to provide 3D real-time rendering package 224 capable of producing "unrealistic" images having artistic embellishments and alterations in the form of NPR effects. Alternatively, in some implementations it may be advantageous or desirable to use NPR software plugin 250 in a hybrid configuration with a game engine that has had its source code modified to perform some NPR rendering functionality, such as custom shading for example.

Figure 3:
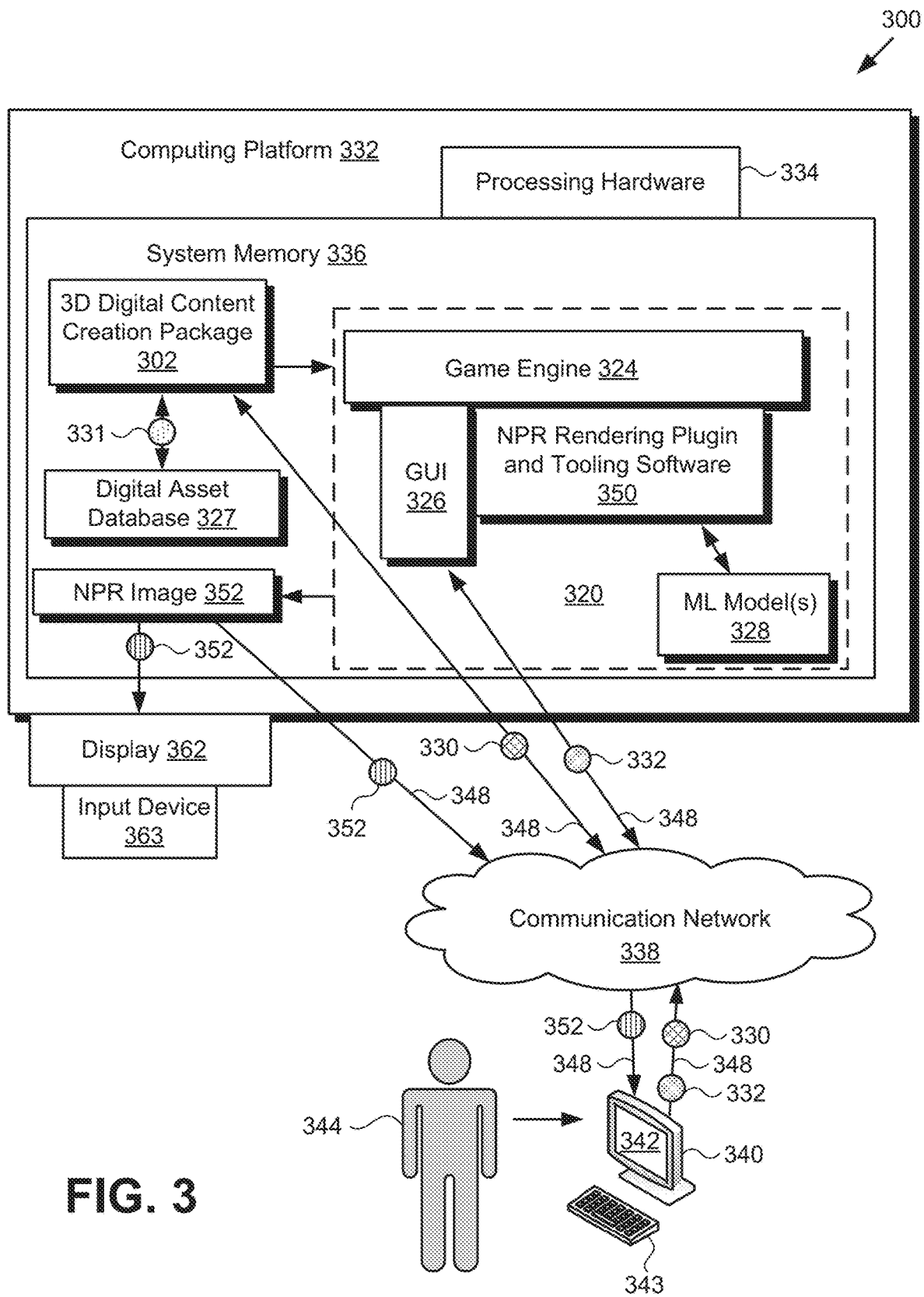
FIG. 3 shows a diagram of an exemplary system for performing real-time NPR rendering, according to one implementation.

FIG. 3 shows a diagram of exemplary system 300 for performing real-time NPR rendering, according to one implementation. As shown in FIG. 3, system 300 includes computing platform 332 having processing hardware 334, system memory 336 implemented as a computer-readable non-transitory storage medium, and may optionally include digital asset database 327, display 362, and input device 363. As further shown in FIG. 3 system memory 336 stores 3D digital content creation package 302 and enhanced 3D rendering package 320 (hereinafter "NPR renderer 320"). NPR renderer 320 includes 3D real-time rendering package 224, in FIG. 2, in the form of a game engine (hereinafter "game engine 324") providing graphical user interface (GUI) 326, NPR software plugin 350 serving as plugin to game engine 324 and configured to modify the game engine 324, as well as to modify GUI 326 to enable control of adjustable parameters of NPR renderer 320. It is noted that, in some implementations, game engine 324 may be a conventional game engine such as one included in 3D traditional rendering package 104, in FIG. 1. However, in those implementations, the performance of game engine 324 is modified by NPR software plugin 350 which is configured to modify the stock rendering engine included in game engine 324 with a custom rendering engine for providing NPR effects. GUI 326 may include the GUI provided by stock game engine 324, but further including editing tools and additional interface panes added by NPR software plugin 350 to allow content creators to manipulate and define looks in real-time in enhanced 3D rendering package 320, without having to render multiple passes and adjust variables in a compositing software. However, in some implementations it may be advantageous or desirable to use NPR software plugin 350 in a hybrid configuration with game engine 324 that has had its source code modified to perform some NPR rendering functionality, such as custom shading for example. That is to say, in some implementations NPR renderer 320 may include game engine 324 in the form of a customized game engine having source code including some instructions for at least one of rendering or compositing NPR image 352, while in other implementations NPR software plugin 350 may include all instructions for rendering and compositing NPR image 352.

In addition to the features described above, in some implementations, NPR renderer 320 may further include one or more machine learning (ML) models 328 (hereinafter "ML model(s) 328"), configured to predict appropriate parametric settings for the NPR renderer 320, as well as to improve the performance of NPR renderer 320 over time. As defined in the present application, the expression "machine learning model" or "ML model" may refer to a mathematical model for making future predictions based on patterns learned from samples of data or "training data." Various learning algorithms can be used to map correlations between input data and output data. These correlations form the mathematical model that can be used to make future predictions on new input data. Such a predictive model may include one or more logistic regression models. Bayesian models, or neural networks (NNs). Moreover, a "deep neural network," in the context of deep learning, may refer to a NN that utilizes multiple hidden layers between input and output layers, which may allow for learning based on features not explicitly defined in raw data. As used in the present application, a feature identified as a NN refers to a deep neural network. In various implementations, NNs may be trained as classifiers and may be utilized to perform image processing, audio processing, or natural-language processing.

As further shown in FIG. 3, system 300 is implemented within a use environment including communication network 338, user system 340 including display 342 and input device 343, and user 344 utilizing user system 340, as well as network communication links 348 interactively connecting user system 340 and system 300 via communication network 338. Also shown in FIG. 3 are content creation data 330 including or identifying digital asset 331, compositing editing data 332 (hereinafter "editing data 332), and NPR image 352 produced as a final output render by system 300 based on editing data 332 and digital asset 331.

System 300 is configured to implement real-time pipeline 200, shown in FIG. 2. Thus, 3D digital content creation package 302, NPR renderer 320, game engine 324, NPR software plugin 350, ML model(s) 328), and NPR image 352 correspond respectively in general to 3D digital content creation package 202, NPR renderer 220, 3D real-time rendering package 224, NPR software plugin 250, and final output render 252, in FIG. 2. Consequently. 3D content creation package 202, NPR renderer 220, 3D real-time rendering package 224, NPR software plugin 250, and final output render 252 may share any of the characteristics attributed to respective 3D digital content creation package 302. NPR renderer 320, game engine 324, NPR software plugin 350, and NPR image 352 by the present disclosure, and vice versa.

As noted above, in some implementations, game engine 324 may be a conventional game engine such as one included in 3D traditional rendering package 104, in FIG. 1. However, the performance of game engine 324 is modified by NPR software plugin 350 which is configured to modify the stock rendering engine included in game engine 324 with a custom rendering engine for providing NPR effects. GUI 326 may include the GUI provided by stock game engine 324, but further including editing tools and additional interface panes added by NPR software plugin 350 to allow content creators to manipulate and define looks in real-time in enhanced 3D rendering package 320, without having to render multiple passes and adjust variables in a compositing software.

Alternatively and as also noted above, in some implementations it may be advantageous or desirable to use NPR software plugin 350 in a hybrid configuration with game engine 324 that has had its source code modified to perform some NPR rendering functionality, such as custom shading for example. That is to say, in some implementations NPR renderer 320 may include game engine 324 in the form of a customized game engine having source code including some instructions for at least one of rendering or compositing NPR image 352, while in other implementations NPR software plugin 350 may include all instructions for rendering and compositing NPR image 352. However, both the hybrid implementation and the NPR software plugin to stock game engine implementations advantageously save substantial time during the finaling process of real-time animation and virtual production projects, allowing for faster deliveries and more creative iteration, as well as allowing for future use cases in interactive media.

Referring to FIGS. 2 and 3 in combination, with respect to NPR image 352 produced as final output render 252 of real-time pipeline 200 implemented by system 300, it is noted that NPR image 352 may correspond to a variety of different types of content. Examples of the types of content NPR image 352 may include are audio-video content having audio and video components, or video unaccompanied by audio. In addition, or alternatively, in some implementations, the type of content included in NPR image 352 may be or include digital representations of persons, fictional characters, locations, objects, and identifiers such as brands and logos, for example, which populate a virtual reality (VR), augmented reality (AR), or mixed reality (MR) environment. Such content may depict virtual worlds that can be experienced by any number of users synchronously and persistently, while providing continuity of data such as personal identity, user history, entitlements, possessions, payments, and the like. Moreover, in some implementations, the content included in NPR image 352 may be a hybrid of traditional audio-video and fully immersive VR/AR/MR experiences, such as interactive video.

Regarding NPR software plugin 250/350, NPR software plugin 250/350 is configured to provide a robust custom stylized shader model that is able to be incorporated into game engine 324, exposing controls to artists in a user-friendly way via customized GUI 326, allowing them to adjust various elements of the predefined look to achieve multiple styles and add either temporary graphics overlay or final-frame graphics overlay. NPR software plugin 250/350 may be configured to provide three main features including custom diffuse wrapping using a bidirectional reflectance distribution function (BDRF), texture breakup of shadow edges and specular edges, and object edge and camera view based NPR effects.

The custom diffuse wrapping feature may include a custom shading model, which may itself include a diffuse reflectance model based on Kubelka-Munk theory, for example, to manipulate how light affects various objects in a frame and interacts with surfaces, as well as how objects are rendered onto a display. The custom shading model provides artistic controls via GUI 326 that change the hardness of the shadow and lighting termination lines, and adjust where those fall, and may be utilized to provide a mostly matte appearance, having a simplified scale of reflectivity. This feature also provides post process stack integration exposing parameters that allow for adjustments to a real-time frame using GUI 326, after the shading and lighting have been rendered (e.g., chromatic aberration, bloom, etc.), and also allows for artistic manipulation of the final image (e.g., textural overlays, style density, pigment darkening/bleeding, etc.).

The texture breakup of shadow edges and specular edges feature allows the application of various textures to regions bordering termination lines and in shadow depending on the light, or lack thereof, hitting a certain object. This feature may be tunable, providing the ability to control the hardness of the shadow or specular edge transition. In addition, this feature provides the ability to breakup or to modify a shadow or specular edge transition with a texture map.

The object edge and camera view based NPR effects feature may provide view based object outlines where the color is based on the albedo of the object but is affected by the scene lighting (e.g., using scene color). In addition, this feature provides art directable control of the object's interior and exterior outlines (e.g., to adjust one or more of line thickness, line presence, line taper, add texture breakup/variation, color override, color tint), and may include stylized bleed effects. For example, custom volume colorizers, (i.e., surface and volumetric) may be used for localized coloring of a two-dimensional (2D) or 3D region in 3D space through a viewport provided by GUI 326 and using in-engine tooling. Alternatively, or in addition, in-depth grease Pen for draw-overs, 2D FX, and smear frame motion blur can allow an artist to draw 2D lines in a 3D space for FX, animation, and note-taking. Vector driven lines may be inserted into an image via GUI 326 and locked to 3D elements to provide one or more 2D animations in a 3D scene.

With respect to the representation of system 300 shown in FIG. 3, it is noted that although 3D digital content creation package 302, NPR renderer 320, and NPR image 352 are depicted as being stored in system memory 336 for conceptual clarity, more generally, system memory 336 may take the form of any computer-readable non-transitory storage medium. The expression "computer-readable non-transitory storage medium," as used in the present application, refers to any medium, excluding a carrier wave or other transitory signal that provides instructions to processing hardware of a computing platform, such as processing hardware 334 of computing platform 332. Thus, a computer-readable non-transitory storage medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory storage media include, for example, optical discs, RAM, programmable read-only memory (PROM), erasable PROM (EPROM), and FLASH memory.

It is further noted that although FIG. 3 depicts 3D digital content creation package 302. NPR renderer 320, and NPR image 352 as being mutually co-located in system memory 336 that representation is also merely provided as an aid to conceptual clarity. More generally, system 300 may include one or more computing platforms, such as computer servers for example, which may be co-located, or may form an interactively linked but distributed system, such as a cloud-based system, for instance. As a result, processing hardware 334 and system memory 336 may correspond to distributed processor and memory resources within system 300. Thus, it is to be understood that 3D digital content creation package 302, NPR renderer 320, NPR image 352 may be stored remotely from one another within the distributed memory resources of system 300.

Processing hardware 334 may include multiple hardware processing units, such as one or more central processing units, one or more graphics processing units, one or more tensor processing units, one or more field-programmable gate arrays (FPGAs), and an application programming interface (API) server, for example. By way of definition, as used in the present application, the terms "central processing unit" (CPU), "graphics processing unit" (GPU), and "tensor processing unit" (TPU) have their customary meaning in the art. That is to say, a CPU includes an Arithmetic Logic Unit (ALU) for carrying out the arithmetic and logical operations of computing platform 332, as well as a Control Unit (CU) for retrieving programs, such as one or more of 3D digital content creation package 302, game engine 324. NPR software plugin 350, and ML model(s) 328 from system memory 336, while a GPU may be implemented to reduce the processing overhead of the CPU by performing computationally intensive graphics or other processing tasks. A TPU is an application-specific integrated circuit (ASIC) configured specifically for artificial intelligence (AI) applications such as machine learning modeling.

In some implementations, computing platform 332 may correspond to one or more web servers, accessible over a packet-switched network such as the Internet, for example. Alternatively, computing platform 332 may correspond to one or more computer servers supporting a private wide area network (WAN), local area network (LAN), or included in another type of limited distribution or private network. However, in some implementations, system 300 may be implemented virtually, such as in a data center. For example, in some implementations, system 300 may be implemented in software, or as virtual machines. Moreover, in some implementations, communication network 338 may be a high-speed network suitable for high performance computing (HPC), for example a 10 GigE network or an Infiniband network.

Although user system 340 is shown as a desktop computer in FIG. 3 that representation is provided merely as an example as well. More generally, user system 340 may be any suitable mobile or stationary computing device or system that implements data processing capabilities sufficient to provide a user interface, support connections to communication network 338, and implement the functionality ascribed to user system 340 herein. For example, in other implementations, user system 340 may take the form of a laptop computer, tablet computer, or smartphone, for example. Furthermore, in some implementations, user system 340 may be a "dumb terminal" peripheral workstation of system 300.

It is noted that, in various implementations, NPR image 352, when generated using enhanced 3D rendering package 320, may be stored in system memory 336, may be copied to non-volatile storage, or both. Alternatively, or in addition, as shown in FIG. 3, in some implementations, NPR image 352 may be displayed on display 362 of system 300, or may be sent to user system 340 including display 342, for example by being transferred via network communication links 348 of communication network 338.

With respect to display 342 of user system 340, display 342 may be physically integrated with user system 340 or may be communicatively coupled to but physically separate from user system 340. For example, where user system 340 is implemented as a smartphone, laptop computer, or tablet computer, display 342 will typically be integrated with user system 340. By contrast, where user system 340 is implemented as a desktop computer, display 342 may take the form of a monitor separate from user system 340 in the form of a computer tower. It is noted that in implementations in which user system 340 is a "dumb terminal" peripheral workstation of system 300, user system 340 and display 342 may be controlled by processing hardware 334 of system 300. Furthermore, display 342 of user system 340, as well as display 362 of system 300, may be implemented as a liquid crystal display (LCD), a light-emitting diode (LED) display, an organic light-emitting diode (OLED) display, a quantum dot (QD) display, or any other suitable display screen that performs a physical transformation of signals to light.

It is also noted that although input device 343 of user system 340 is depicted as a keyboard, that representation is also merely by way of example. More generally, input device 343, as well as input device 363 of system 300, may take the form of a touchscreen, a touchscreen in combination with a pen or stylus, a trackpad, a mouse, or a voice command input unit (e.g., microphone), to name a few examples.

The functionality of system 300 implementing real-time pipeline 200 in FIGS. 2 and 3 will be further described by reference to FIG. 4, which shows flowchart 470 describing an exemplary method for performing real-time NPR rendering, according to one implementation. With respect to the actions described in FIG. 4, it is noted that certain details and features have been left out of flowchart 470 in order not to obscure the discussion of the inventive features in the present application.

Figure 4:
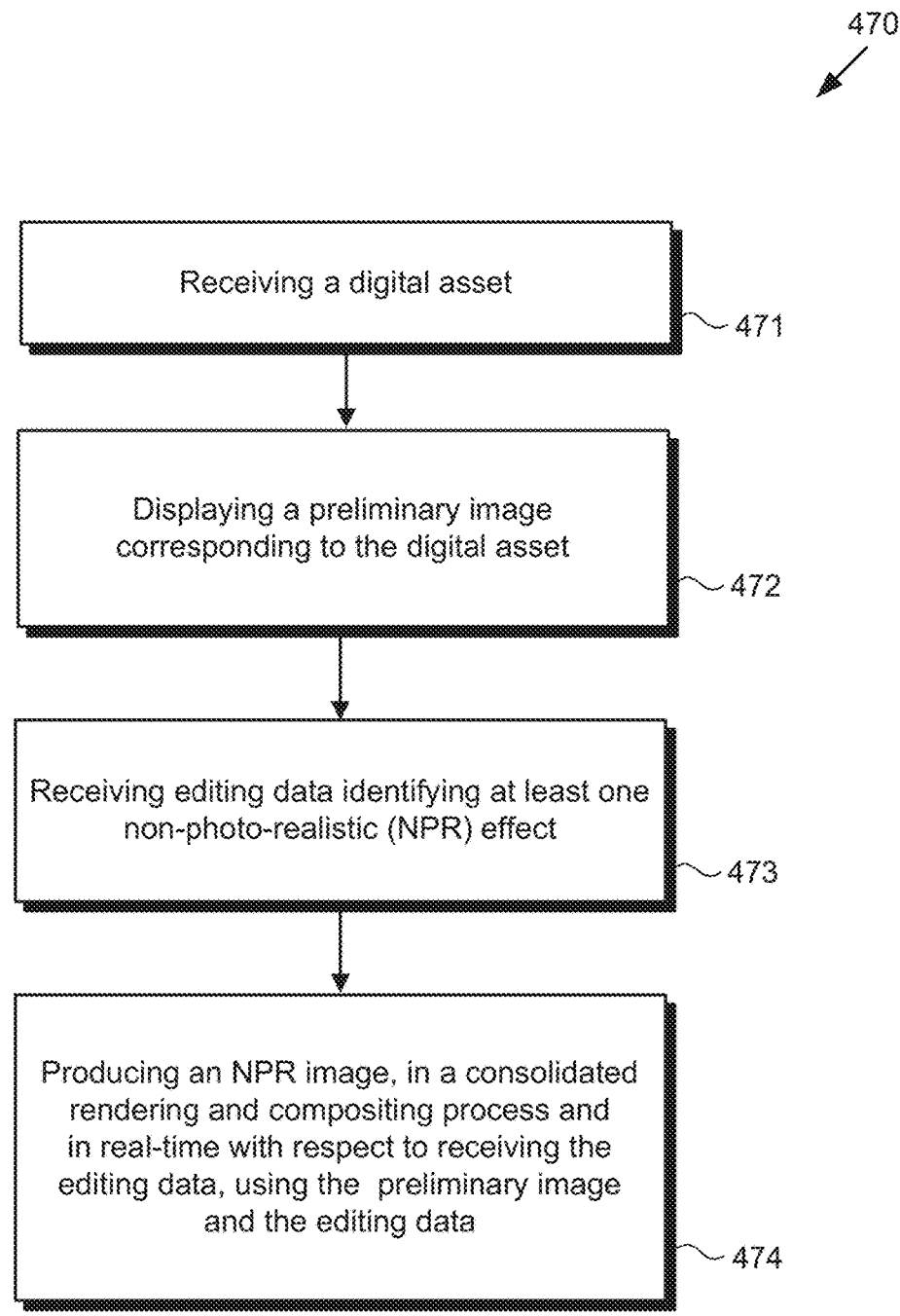
FIG. 4 shows a flowchart describing an exemplary method for performing real-time NPR rendering, according to one implementation.

Referring to FIG. 4 in combination with FIG. 3, flowchart 470 includes receiving digital asset 331 (action 471). Digital asset 331 may be a digital image, such as a photograph or frame of video, for example. Alternatively digital asset 331 may be a video sequence, or a 2D or 3D digital model. In some implementations, digital asset 331 may be received in action 471 as part of content creation data 330. In those implementations, digital asset 331 may be extracted from content creation data 331 by 3D digital content creation package 302 and may be transferred to NPR renderer 320 by 3D digital content creation package 302. Alternatively, in some implementations, content creation data 330 may simply identify digital asset 331. In those implementations, 3D digital content creation package 302, in response to receiving content creation data 330, may obtain digital asset 331 from digital asset database 337 and may provide digital asset as an input to NPR renderer 320. Digital asset 331 may be received in action 471 by NPR renderer 320, executed by processing hardware 334 of system 300. For example, NPR software plugin 350 may be executed by processing hardware 334 to control game engine 324 to receive digital asset 331 in action 471.

Flowchart 470 further includes displaying a preliminary image corresponding to digital asset 331 (action 472). Action 472 may be performed by NPR renderer 320, executed by processing hardware 334 of system 300, and using GUI to display the preliminary image via display 362 of system 300 or display 342 of user system 340.

Flowchart 470 further includes receiving editing data 332 identifying an NPR effect (action 473). Editing data 332 may be received in action 473 by NPR renderer 320, executed by processing hardware 334 of system 300. For instance, and as shown by FIG. 3, editing data 332 may be received via GUI 326, from user system 340, in response to inputs provided to user system 340 by user 344 utilizing input device 343. It is noted that although flowchart 470 describes receiving editing data 332 identifying "an" NPR effect, in the singular, merely in the interests of conceptual clarity, in some implementations, editing data 332 may identify more than a single NPR effect (i.e., two or more NPR effects).

For example, an NPR effect identified by editing data 332 may include how light affects various objects in a video frame and interacts with surfaces, as well as how objects are rendered onto a display. Moreover, an NPR effect identified by editing data 332 may include artistic controls that change the hardness of the shadow and lighting termination lines, and adjust where they fall. In addition, or alternatively, an NPR effect identified by editing data 332 may include a description of how the outlines of objects should appear on a display. In some use cases, an NPR effect identified by editing data 332 may include stylization of objects as well as lighting and rendering systems. (e.g., scene depth driven manipulation, object proximity and overlap manipulation).

In some implementations, an NPR effect identified by editing data 332 may call for the application of various textures to regions bordering termination lines and in shadow depending on the light, or lack thereof, hitting a certain object. According to some implementations, an NPR effect identified by editing data 332 may include texture applied to various shading of objects to manipulate looks like water-color bleeding or half-tone patterning seen in comic books. In some implementations, an NPR effect identified by editing data 332 may include an adjustment to a real-time frame after the shading and lighting have been rendered (e.g., chromatic aberration, bloom, etc.), and may also allow for artistic manipulation of the final image (e.g., textural overlays, style density, pigment darkening/bleeding, and the like). In some implementations, an NPR effect identified by editing data 332 may include localized coloring of a 2D or 3D region in 3D space through a viewport provided by GUI 326 and using in-engine tooling. Moreover, in some implementations, an NPR effect identified by editing data 332 may be produced using an in-depth grease pen for draw-overs, 2D FX, and smear frame motion blur, resulting in 2D lines in a 3D space for FX, animation, and note-taking. Vector driven lines may be inserted into an image via GUI 326 and locked to 3D elements to provide one or more 2D animations in a 3D scene.

Flowchart 470 further includes producing NPR image 352, in a consolidated rendering and compositing process and in real-time with respect to receiving editing data 332, using the preliminary image displayed in action 472 and editing data 332 received in action 473 (action 474). NPR image 352 may be produced in action 474 by NPR renderer 320, executed by processing hardware 334 of system 300. For example, NPR software plugin 350 may be executed by processing hardware 334 of system 300 to control game engine 324 to produce NPR image 352 in a consolidated rendering and compositing using the preliminary image displayed in action 472 and editing data 332 received in action 473.

With respect to producing NPR image 352 in real-time with respect to receiving editing data 332, as noted above, in some implementations, NPR renderer 320 may be configured to produce NPR image 352 within less than 60 seconds of receiving editing data 332 in action 473. Moreover and as further noted above, in some implementations. NPR renderer 320 may be configured to produce NPR image 352 within 10 seconds or less of receiving editing data 332. For instance, in some implementations NPR renderer 320 may be capable of producing NPR images corresponding to NPR image 352 at a frame rate of up to 24 frames per second.

In some implementations, the rendering performed as part of action 474 may use a diffuse reflectance model based on Kubelka-Munk theory. In addition, or alternatively, the compositing performed as part of action 474 may use a non-linear smoothing filter, such as one of a Kuwahara filter or a modified Kuwahara filter, for example.

As noted above by reference to FIG. 3, in some implementations NPR renderer 320 may further comprise one or more machine learning model(s) 328 trained to predict, based on editing data 332 and digital asset 331, one or more operating parameters for use by NPR renderer 320 when performing the rendering and compositing in action 474 to produce NPR image 352. The inclusion and use of one or more machine learning model(s) 328 as features of NPR renderer 320 may be particularly important in use cases in which digital asset 331 is a complex digital asset, such as a high mesh element count 3D digital model for example, or where several NPR effects, or mutually influential NPR effects, are identified by editing data 332. In those use cases, the number of possible permutations for operating parameters of NPR renderer 320 may far exceed the ability of a human mind, or even a generic computer processor, to effectively evaluate. In those implementations, NPR renderer 320 may be reliant upon the performance of one or more predictive machine learning models 328 to achieve the performance improvements, including real-time NPR rendering, described in the present application.

With respect to the method outlined by flowchart 470, it is noted that, in some implementations, action 471, 472, 473, and 474 may be performed in an automated process from which human participation may be omitted.

Thus, the present application discloses systems and methods for performing real-time NPR rendering that reduces computation times for NPR rendering. As described above, in some implementations, the present real-time NPR rendering solution provides an NPR software plugin that can serve as a plugin to a conventional game engine and that modifies the stock renderer included in the game engine with a custom NPR renderer that enables compositing of artistic images in real-time, thereby requiring low overhead for final rendering. In addition, the custom NPR renderer disclosed by the present application advantageously provides the flexibility to achieve a range of art directed stylized aesthetic looks outside of those that are physically based or have previously been developed. As a result, the concepts disclosed herein advance the state-of-the-art significantly beyond existing solutions created for offline renderers that require long render times, such as several hours per frame, as well as several render passes compiled in compositing software.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A method for use by a system including processing hardware and a system memory storing a non-photo-realistic (NPR) renderer, the method comprising:
   receiving, by the NPR renderer executed by the processing hardware, a digital asset;

displaying, by the NPR renderer executed by the processing hardware, a preliminary image corresponding to the digital asset;

receiving, by the NPR renderer executed by the processing hardware, editing data identifying an NPR effect; and producing the NPR image, by the NPR renderer executed by the processing hardware in a consolidated rendering and compositing process and in real-time with respect to receiving the editing data, using the preliminary image and the editing data;

wherein the NPR renderer includes at least one machine learning model trained to predict, based on the editing data and the digital asset, one or more operating parameters for use by the NPR renderer when rendering and compositing the NPR image.

2. The method of claim 1, wherein the NPR renderer comprises a game engine and an NPR software plugin including instructions configured to modify a performance of the game engine to render and composite the NPR image.

3. The method of claim 2, wherein the game engine comprises a customized game engine having source code including some instructions for at least one of rendering or compositing the NPR image.

4. The method of claim 1, wherein the consolidated rendering and compositing process uses diffuse wrapping includes a shading model for rendering.

5. The method of claim 4, wherein the shading model includes a diffuse reflectance model based on Kubelka-Munk theory for rendering.

6. The method of claim 1, wherein the consolidated rendering and compositing process uses a non-linear smoothing filter for compositing.

7. The method of claim 6, wherein the non-linear smoothing filter is one of a Kuwahara filter or a modified Kuwahara filter.

8. The method of claim 1, wherein the NPR renderer produces the NPR image by manipulating how light affects various objects or interacts with surfaces.

9. A system comprising:
processing hardware and a system memory storing a non-photo-realistic (NPR) renderer;
the processing hardware configured to execute the NPR renderer to:
receive a digital asset;
display a preliminary image corresponding to the digital asset;
receive editing data identifying an NPR effect; and
produce an NPR image, in a consolidated rendering and compositing process and in real-time with respect to receiving the editing data, using the preliminary image and the editing data;
wherein the NPR renderer includes at least one machine learning model trained to predict, based on the editing data and the digital asset, one or more operating parameters for use by the NPR renderer when rendering and compositing the NPR image.

10. The system of claim 9, wherein the NPR renderer comprises a game engine and an NPR software plugin including instructions configured to modify a performance of the game engine to render and composite the NPR image.

11. The system of claim 10, wherein the game engine comprises a customized game engine having source code including some instructions for at least one of rendering or compositing the NPR image.

12. The system of claim 9, wherein the consolidated rendering and compositing process uses diffuse wrapping includes a shading model for rendering.

13. The system of claim 12, wherein the shading model includes a diffuse reflectance model based on Kubelka-Munk theory for rendering.

14. The system of claim 9, wherein the consolidated rendering and compositing process uses a non-linear smoothing filter for compositing.

15. The system of claim 14, wherein the non-linear smoothing filter is one of a Kuwahara filter or a modified Kuwahara filter.

16. The system of claim 9, wherein the NPR renderer is configured to produce the NPR image by manipulating how light affects various objects or interacts with surfaces.

* * * * *